April 6, 1954     J. DRACOS ET AL     2,674,462
WEEDING CART
Filed Sept. 2, 1952     2 Sheets-Sheet 1
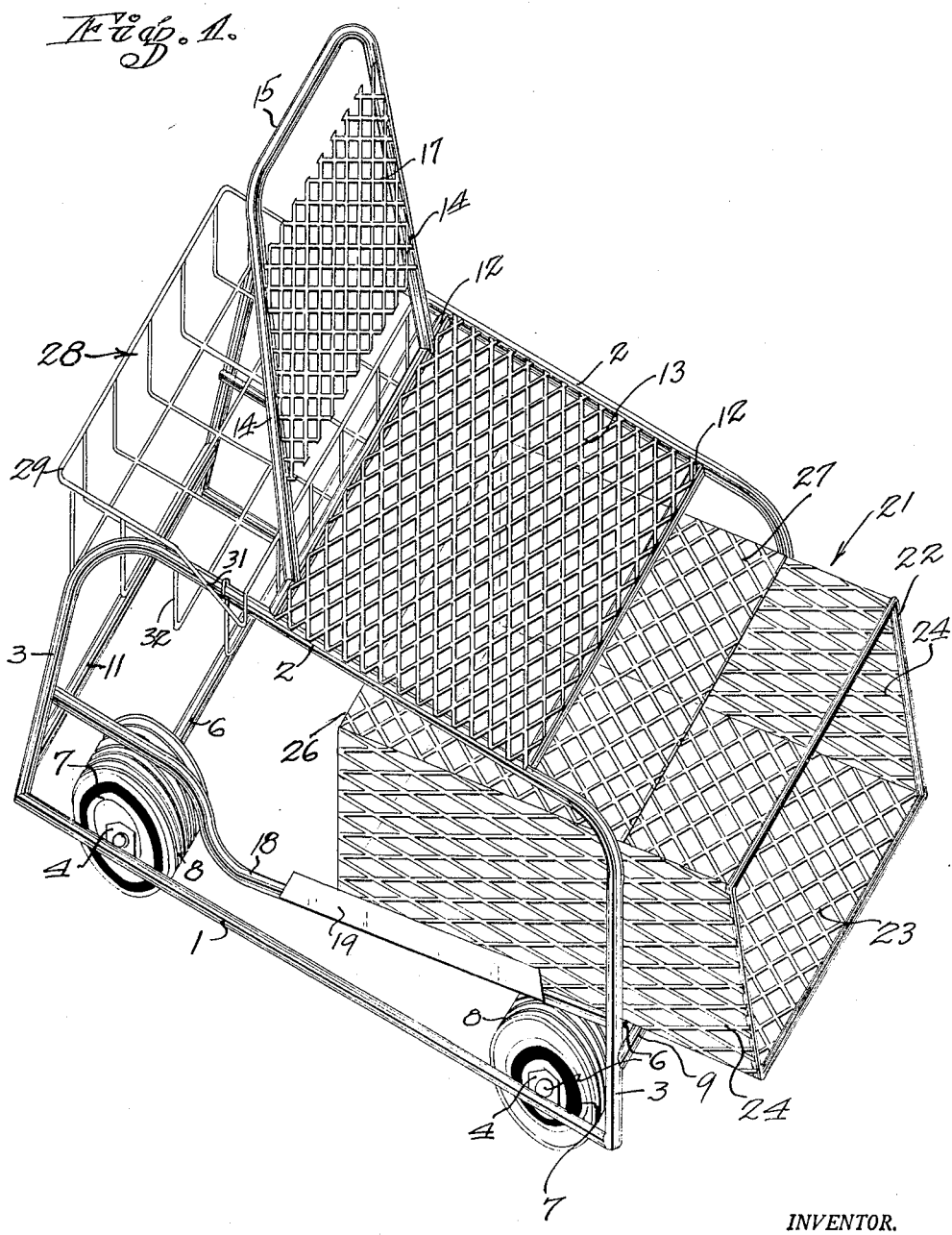
INVENTOR.
JOHN DRACOS
JOHN W. WILLIAMS
BY George B. White
ATTORNEY April 6, 1954  J. DRACOS ET AL  2,674,462
WEEDING CART
Filed Sept. 2, 1952  2 Sheets-Sheet 2
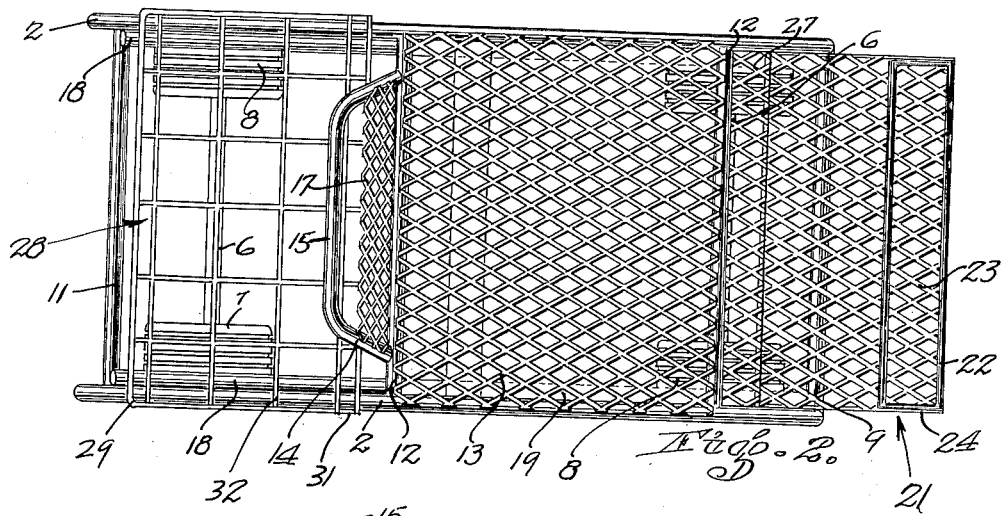
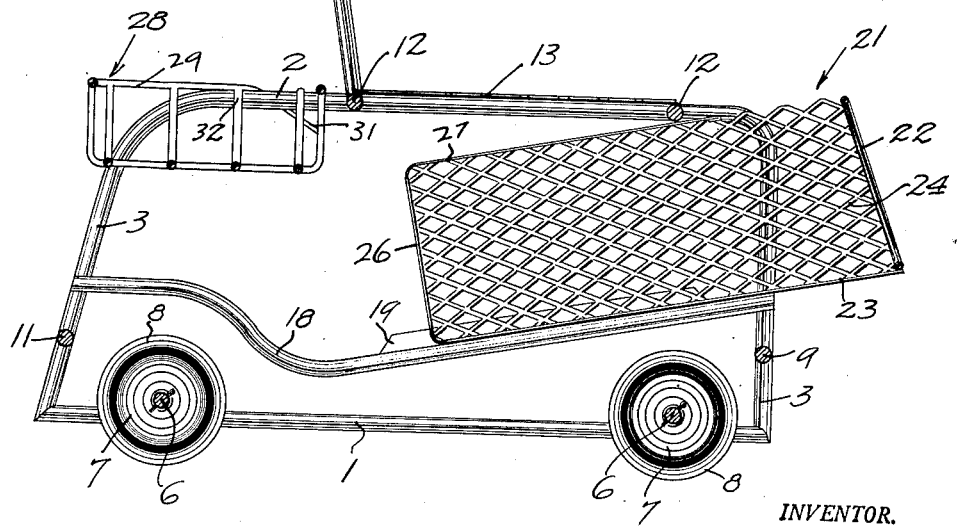
INVENTOR.
JOHN DRACOS
JOHN W. WILLIAMS
BY George B White
ATTORNEY Patented Apr. 6, 1954

2,674,462

UNITED STATES PATENT OFFICE 2,674,462

WEEDING CART

John Dracos and John W. Williams,
Monterey, Calif.

Application September 2, 1952, Serial No. 307,528

2 Claims. (Cl. 280—32.5)

This invention relates to a weeding cart.

The primary object of the invention is to provide a cart on which a person can sit and be mobile at the same time, namely a person could propel himself by his feet in a sitting position comfortably while weeding, lawn trimming, flower-bed hoeing, spraying and performing other operations in a garden or in the field, without the necessity for stooping or supporting the weight otherwise excepting sitting position.

The features of our invention include: a firm low frame which is of such height as to permit the feet of a person to reach the ground in sitting position and of such width that it can be straddled by the user; the supporting of base frame upon comparatively wide wheels so that the frame may be propelled without making deep impressions into the ground; the provision of suitable backrest on the frame adjacent to a seat to provide for comfort of the user; a slidable collection basket on an inclined guide telescoping under the seat so that it may be pulled forwardly and outwardly into a convenient position to receive cuttings or the like; and a tool basket behind the backrest for holding suitable tools for cultivation of the type previously performed in stooping or kneeling positions.

We are aware that some changes may be made in the general arrangements and combinations of the several devices and parts, as well as in the details of the construction thereof without departing from the scope of the present invention as set forth in the following specification and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a perspective view of a weeding cart constructed in accordance with our invention.

Fig. 2 is a top plan view of our weeding cart and

Fig. 3 is a longitudinal sectional view of our weeding cart.

In carrying out our invention we make use of a pair of side frames each of which is made in the form of a generally rectanglar rigid unitary, preferably welded, skeleton frame and consists of a lower logitudinal bar 1, a top seat bar 2 and vertical connecting bars 3 at the front and at the rear. On each lower bar 1 are a pair of spaced ears 4, one near the front and the other near the rear of the frame. The opposite ears 4 on the opposite side frames are aligned so as to fixedly hold therein an axle 6. On each the front and rear axle 6, are supported a pair of spaced wheels 7 preferably having wide tires 8 thereon. The wheels 7 rotate on the axles.

The opposite side frames are held spaced from one another by a cross bar 9 in the front and a cross bar 11 at the rear of the cart welded together so as to fixedly space the sides. The cross bars 9 and 11 are at the lower portions of the side frames but spaced from the adjacent wheel peripheries so as to permit free rotation of the wheels.

The top bars 2 of the respective side frames are spaced and connected by cross bars 12 spaced longitudinally on the top bars 2 and fixedly secured in place. The cross bars 12 and the portions of the top bars 2 between the cross bars 12 define the area of the seat which is preferably covered by a sheet 13 of expanded metal 13 which forms the seat.

From the rear cross bar 12 extends upwardly and fixedly a loop frame consisting of vertical side portions 14 and the connecting top portion 15 rigidly held in upwardly extending position. A sheet of expanded metal 17 between the vertical portions 14 forms a comfortable backrest, spaced forwardly from the rear end of the skeleton frame.

In each side frame a guide bar 18 is extended fixedly from the front vertical bar 3 at a point spaced above the adjacent wheel 7 and inclined rearwardly and downwardly to the proximity of the rear wheel 7 on the same side and then bent upwardly so as to clear above the rear wheel 7 and connect to the rear vertical bar 3. These guide bars are also fixedly welded in position. Each guide bar 18 has thereon a guide flange 19.

Between the guide flanges 19 and on the guide bar 18 is slidably supported a collecting basket 21. The basket 21 is held in rearwardly and downwardly inclined position and is constructed from a generally rectangular front bar frame 22, from the lower horizontal side of which extends an expanded metal bottom 23. An expanded metal side 24 extends from each vertical side of the front frame 22 rearwardly and is fixedly united with the bottom 23 so as to form sliding corners along the respective guide flanges. An expanded metal rear wall 26 connects the rear ends of the basket sides 24. A top 27, also of expanded metal sheet, extends from the rear wall 26 forwardly to a line spaced from the top of the front frame 22 so as to leave a top opening, in addition to the front opening within said frame 22 to facilitate the throwing of cuttings into the basket.

On the rear portions of the top side bars 2 behind the backrest is supported a tool basket 28 which is made of suitable strong wire. A generally rectangular top frame 29 of this tool basket has its forward corners bent at right angles downwardly so as to form ears 31 which extend over the top to the outside of the adjacent top bar 2. The side wires 32 are bent outwardly at the top to extend over the respective top bars 2. In this manner the tool basket is securely but removably held in place.

In operation, particular hand tools such as a weed digger, a short hoe, shears, or the like tools for weeding and trimming are placed in the tool basket 28. The collecting basket 21 is pulled forwardly and upwardly so that its open end is conveniently located in front of the user. The user straddles the cart and rests upon the seat and against the backrest, while his feet touch the ground so that he may propel himself conveniently and easily. As the user pushes himself and the cart along the strip or area to be cultivated or worked on, he can handle the tools in his hands without stooping or straining his back or knee muscles. The weeds, cuttings, or trimmings, are picked up by him and placed in the front basket conveniently. The user can change tools by simply reaching back into the tool basket. The wide wheels leave no deep impression or marks on the ground. The device is eminently adapted for its purposes, it greatly facilitates cultivation and weeding which is now performed by stooping or kneeling, it is operated easily and the parts are arranged in a convenient way for the operation.

We claim:

1. A cart for weeding and cultivating and the like, comprising a skeleton frame of a height to permit a person to sit on top of said frame with the feet touching the ground, a seat on the top of said frame, the width of said frame being such as to allow the straddling of the frame by the person seated on said seat, and wheels on the lower portion of said frame, upwardly and forwardly inclined guides on the opposite sides of said frame below said seat, a collecting basket slidable on said guides forwardly and upwardly, the forward end of said basket being for depositing cuttings therein.

2. A cart for weeding and cultivating and the like, comprising a skeleton frame of a height to permit a person to sit on top of said frame with the feet touching the ground, a seat on the top of said frame, the width of said frame being such as to allow the straddling of the frame by the person seated on said seat, and wheels on the lower portion of said frame, said skeleton frame comprising a pair of parallel side frames, each side frame including a base bar, a pair of vertical bars at the front and rear ends respectively of said base bar and a top connecting bar, horizontal transverse spaced connecting bars connecting the top bars of the side frame, said seat being formed on said transverse bars and by the portions of the top bars between said transverse bars, and a brace member connecting the respective vertical bars at the front and rear of said cart, and a guide bar extended in each side frame from the front vertical bar to the rear vertical bar inclined downwardly and rearwardly and then upwardly and around the rear wheel to the rear bar; guides on the inclined portions of said guide bars, a basket having longitudinal sides slidable on said guides, and having its front end open so as to be adjustable forwardly and upwardly from under said seat.

References Cited in the file of this patent

UNITED STATES PATENTS

| Number | Name | Date |
|---|---|---|
| 667,370 | Sowder | Feb. 5, 1901 |
| 2,033,037 | Lang | Mar. 3, 1936 |